United States Patent

Lotfipour

Patent Number: 6,142,263
Date of Patent: Nov. 7, 2000

[54] MULTI-LAYER BRAKE ELEMENT WITH ENHANCED THERMAL INSULATION

[75] Inventor: Mahmoud Lotfipour, Stockport, United Kingdom

[73] Assignee: Ferodo Limited, United Kingdom

[21] Appl. No.: 09/101,586

[22] PCT Filed: Jan. 13, 1997

[86] PCT No.: PCT/GB97/00075

§ 371 Date: Jul. 30, 1998

§ 102(e) Date: Jul. 30, 1998

[87] PCT Pub. No.: WO97/25549

PCT Pub. Date: Jul. 17, 1997

[30] Foreign Application Priority Data

Jan. 11, 1996 [GB] United Kingdom .................. 9600561

[51] Int. Cl.[7] ....................................................... F16D 65/38
[52] U.S. Cl. ................................... 188/73.37; 188/250 B; 188/250 E
[58] Field of Search .......................... 188/250 B, 250 E, 188/250 C, 250 H, 250 A, 250 R, 251 R, 251 A, 256, 73.35, 73.36, 73.37

[56] References Cited

U.S. PATENT DOCUMENTS

| | | | |
|---|---|---|---|
| 4,373,615 | 2/1983 | Melinat | 188/73.37 |
| 5,099,962 | 3/1992 | Furusu et al. | 188/73.37 |
| 5,407,034 | 4/1995 | Vydra et al. | 188/73.37 |

FOREIGN PATENT DOCUMENTS

| | | |
|---|---|---|
| 0 686 785 A1 | 12/1995 | European Pat. Off. . |
| 59-050236 | 3/1984 | Japan . |
| 2 086 502 | 5/1982 | United Kingdom . |
| 2 125 126 | 2/1984 | United Kingdom . |
| 2 260 173 | 4/1993 | United Kingdom . |
| 2 261 711 | 5/1993 | United Kingdom . |
| 22611711 | 5/1993 | United Kingdom . |

Primary Examiner—Christopher P. Schwartz
Assistant Examiner—Robert A. Siconolfi
Attorney, Agent, or Firm—Nixon & Vanderhye P.C.

[57] ABSTRACT

An intermediate layer (4) of a relatively low thermal conductivity, high resistance to thermal degradation elastomeric material is interposed between a friction lining (3) and a relatively soft elastomeric layer (5), the latter being bonded to a backing plate (2).

21 Claims, 1 Drawing Sheet

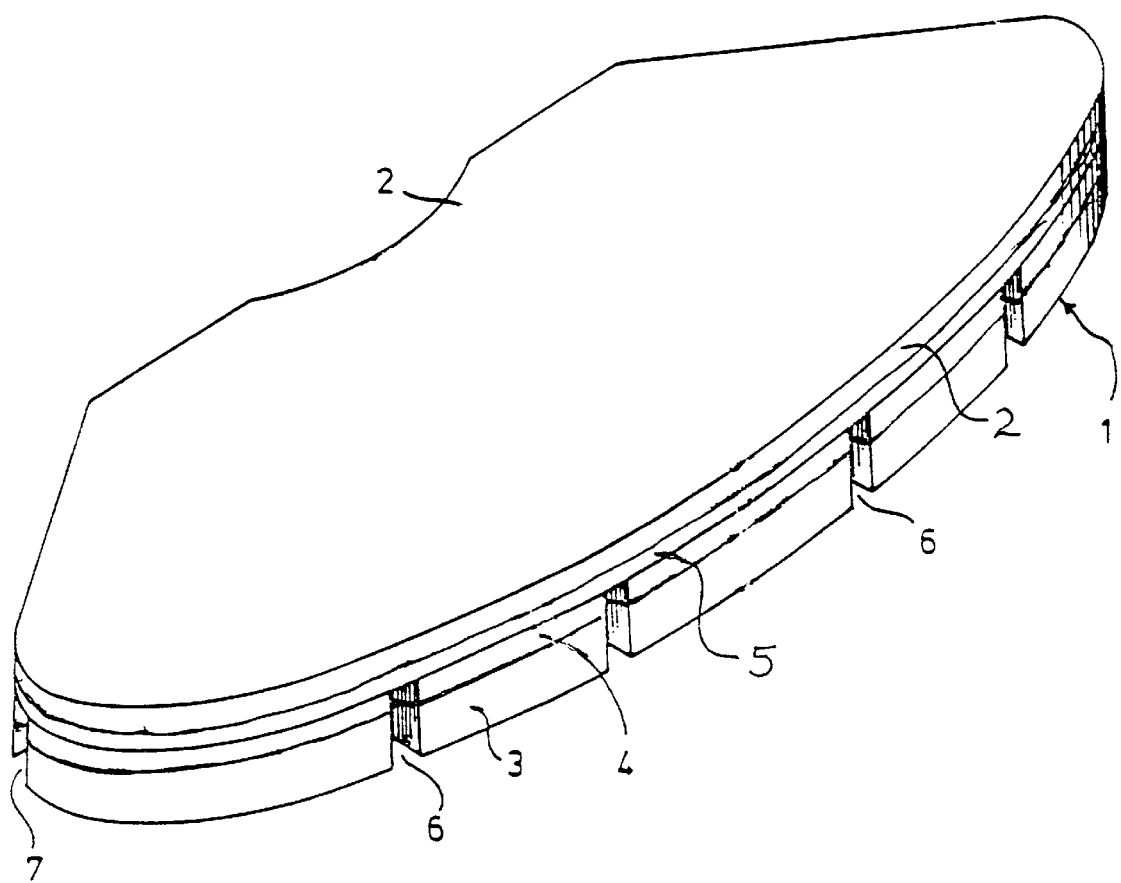

MULTI-LAYER BRAKE ELEMENT WITH ENHANCED THERMAL INSULATION

This invention relates to brake elements particularly useful for railway braking applications.

It is known from PCT/GB94/01964 (WO95/07418) that modern high speed train systems routinely impose extremely severe loading on the brake pads, especially on disk brake pads. This is due to the substantial amounts of energy which have to be dissipated every time the brakes are applied, resulting in the attainment of extremely high working temperatures, typically well in excess of 1000° C. WO95/07418 discloses a friction pad composition suitable for this type of heavy duty braking service.

It is also known from PCT/GB92/02055 (WO93/10370) to interpose a layer of a relatively soft elastomeric material between a layer of friction material and a backing plate in order to confer a degree of resilience onto the assembly, thereby enabling the working face of the friction lining to conform more uniformly to the confronting surface of the moving element of the system which is to be braked. The elastomer material should exhibit a Rockwell hardness value below that of the friction lining in order to ensure satisfactory conformability.

In relatively moderate braking applications the technique disclosed in WO93/10370 has proved valuable in considerably extending brake element working life.

Unfortunately, attempts to apply the concept of WO/93/10370 to severe duty braking applications of the kind addressed by WO95/07418 have not proved successful, due to the extremely high temperatures developed in use.

According to the present invention a brake element comprising a friction material lining and a backing plate, together with a relatively soft layer of elastomeric material being interposed between said friction material lining and said backing plate, is characterised in that a further layer of elastomeric material of relatively low thermal conductivity and relatively high resistance to thermal degradation is interposed between the friction material lining and the relatively soft layer of elastomeric material. The further layer is preferably semi-conformable relative to the soft underlayer. That is to say it is more conformable than the friction layer, but less conformable than the underlayer.

It has bee n found that the incorporation of the further elastomeric material layer with relatively poor thermal conductivity allied to high resistance to thermal degradation makes it possible to utilise the technique of WO93/10370 to very considerably enhance the useful service life of severe duty disk brake pads of the kind disclosed in WO95/07418. In a typical case the service life may be extended from an unacceptable 1.5 months to as much as 10 or 11 months before replacement is necessary. The further layer apparently serves to protect the soft elastomeric material layer from the heat generated in the top layer of friction material.

The further layer is preferably formulated to have a thermal conductivity on t he order of only 8–12% of that of the friction layer. Th is will normally be greater than that of the relatively soft elastomeric material layer. All three layers are preferably formulated so as to avoid or at least minimise interface shear stresses due to thermal expansion developed in response to the temperatures attained in braking service. This may be done by appropriate choice of materials such as fillers and/or metallic ingredients for the two elastomeric material layers. For practical purposes it has proved sufficient to formulate the elastomer material layers for a thermal expansion of the order of 0.01 mm to 0.05 mm, over a temperature range of, say, ambient to 200° C. and determined in accordance with the test method described below, using a sample length of 8 mm.

Advantageously, the longitudinal and/or transverse grooving of WO95/07418 is employed, but with the grooves extending through both the friction material layer and through the further elastomeric material layer to the interface between the latter and the relatively soft elastomeric material layer. This has been found to enhance the conformability of the friction lining in use against the confronting moving surface of a brake disk.

It is preferred that the friction material lining has a modulus of elasticity in the range 1000–2000 N/mm$^2$, the further layer has a modulus of elasticity in the range 300–800 N/mm$^2$ and the relatively soft elastomeric material layer has a modulus of elasticity in the range 50–100 N/mm$^2$, as determined for temperatures in the range from ambient to 200° C.

In the present context, modulus of elasticity is measured by applying a load of 312.5 N to a material sample of 25 mm cube seven times, at a loading rate of 2 mm/minute. The deflection is measured by an LVDT transducer and the modulus is calculated as maximum stress divided by total strain, (otherwise known as the secant modulus). This test can be carried out at different temperatures if desired; the figures quoted herein are for the seventh loading cycle.

In order that the invention be better understood a preferred embodiment of it will now be described by way of example with reference to the accompanying drawing. In the drawing the sole FIGURE is a schematic view of a disk brake pad constructed in accordance with the present invention. The drawing shows a metal backplate 2 and a friction layer 3. A relatively soft elastomeric material layer 5 is in contact with the backplate and is disposed between the latter and the friction material layer 3. A further layer of elastomeric material 4 is interposed between the layers 3 and 5. Transverse and longitudinal grooves 6, 7 are provided extending from the working face 1 of the friction material to the interface between the layers 4 and 5.

In this case, the relatively soft elastomeric material layer 5 was formulated to exhibit a Rockwell penetration hardness at least twice that of the friction material. The further layer of elastomeric material 4 was formulated to have a thermal conductivity not much greater than that of the soft elastomeric material layer 5, but very much lower than that of the friction material layer 3. It was also formulated to have high resistance to thermal degradation.

To further illustrate the invention, examples of typical formulations are given below, although it will be appreciated that these are examples only; those skilled in the art will realise that numerous permutations are possible without departing from the invention. All percentages are by volume.

| Friction material layer | |
| --- | --- |
| Phenolic resin | 15% |
| Metallic (copper) fibres | 7% |
| Other fibres (mineral fibres) | 5% |
| Friction modifiers | 10% |
| Fillers/load bearing agents | 48% |
| Graphite | 15% |
| Relatively soft elastomeric material layer | |
| Phenolic resin | 9% |
| SBR Rubber | 44% |
| Metallic (steel) fibres | 11% |
| Other fibres (organic) | 4% |
| Friction modifiers | 4% |

-continued

| | |
|---|---|
| Fillers (barytes) | 25% |
| Activators (sulphur etc) | 3% |
| Further elastomeric material layer | |
| Nitrile rubber | 20% |
| Metallic (steel) fibres | 10% |
| Abrasives | 12% |
| Friction modifier | 4% |
| Vermiculite | 30% |
| Fillers (barytes) | 22% |
| Activators (sulphur etc) | 2% |

Processing of these mixes into the final disk brake pad product was carried out conventionally. The measured physical properties of the layers were as follows:

1. Modulus of elasticity (N/mm$^2$)
(determined by the method described earlier)

| | Room Temperature | 50° C. | 100° C. | 200° C. |
|---|---|---|---|---|
| Friction layer | 1700 | 1600 | 1200 | 1100 |
| Further layer | 500 | 450 | 400 | 300 |
| Soft layer | 80 | 70 | 70 | 70 |

2. Thermal expansion from room temperature to 200° C.

| | |
|---|---|
| Friction layer | 0.02 mm |
| Further layer | 0.01 mm |
| Soft layer | 0.03 mm |

3. Thermal conductivity (W/mK)

| | |
|---|---|
| Friction layer | 8.455 |
| Further layer | 0.801 |
| Soft layer | 0.536 |

For present purposes, thermal conductivity was determined by testing a standard disk of material 1.6 inches (40.6 mm) in diameter, 0.1875 inches (5 mm) thick in the conventional Lees' conductivity apparatus. After measuring the thickness, the faces of the sample were coated with a thermally conductive paste prior to assembling three copper disks and two samples as a stack which was heated from one end over a period of at least six hours whilst monitoring the copper disk temperatures, and prior to calculating the conductivity, in the usual way.

In service, a disk brake pad as just described exhibited good service life in terms of wear rate and absence of "hot spots" due to uneven pressure. It was highly conformable to an associated brake disk in use and it had excellent resistance to thermal damage, even under severe operating temperatures.

The thermal expansion figures quoted in 2 above were determined by heating a sample 5 mm by 8 mm square and 5 mm thick at controlled rate to 200° C. The change in the 8 mm dimension was measured by a probe. The sample was then cooled at the same rate and the contraction measured. The test was repeated with a second sample, to determine an average value. The rate of heating/cooling was 5° C. per minute.

What is claimed is:

1. A brake element comprising:
   a friction material lining,
   a backing plate being spaced from the friction material layer and carrying a relatively soft layer of elastomeric material,
   and a further layer of elastomeric material interposed between, and directly affixed to, said relatively soft layer of elastomeric material and said friction material lining, said further layer of elastomeric material having a thermal conductivity which is low relative to said friction material lining and a resistance to thermal degradation which is high relative to said relatively soft layer of elastomeric material.

2. A brake element according to claim 1 having grooves extending transversely and/or longitudinally with respect to the major plane of the element, wherein said grooves extend through said friction material lining and through said further layer of elastomeric material to said relatively soft elastomeric layer.

3. A brake element according to claim 1 wherein the thermal conductivity of said further layer of elastomeric material is in the range of from 8–12% of that of said friction material lining, but greater than that of said relatively soft layer of elastomeric material.

4. A brake element according to claim 1 wherein said friction material lining, said relatively soft layer of elastomeric material and said further layer of elastomeric material are formulated to exhibit approximately the same amount of thermal expansion when heated from ambient temperature to 200° C.

5. A brake element according to claim 4 wherein said expansion is in the range 0.01 mm to 0.05 mm, referred to a sample dimension of 8 mm.

6. A brake element according to claim 1 wherein said friction material lining has a modulus of elasticity in the range 1000–2000 N/mm$^2$, said further elastomeric material layer has a modulus of elasticity in the range 300–800 N/mm$^2$ and said relatively soft elastomeric layer has a modulus of elasticity in the range 50–100 N/mm$^2$, as determined for temperatures in the range from ambient to 200° C.

7. A disk brake pad comprising:
   a metal backplate and a friction layer separated by first and second elastomeric layers; said metal backplate engaged with said first elastomeric layer and said friction lining engaged with said second elastomeric layer; said first and second elastomeric layers directly engaged with each other, and wherein said second elastomeric layer is softer than said friction lining and has as resistance to thermal degradation higher than said first elastomeric layer.

8. The disk brake pad of claim 7 wherein said friction lining and said second elastomeric layer are formed with a plurality of grooves therein.

9. The disk brake pad of claim 7 wherein said friction lining and said first and second layers of elastomeric material are formulated to exhibit approximately the same amount of thermal expansion when heated from ambient temperature to 200° C.

10. A brake element according to claim 7 wherein said friction lining has a modulus of elasticity in the range 1000–2000 N/mm$^2$, said second elastomeric material layer has a modulus of elasticity in the range 300–800 N/mm$^2$ and said first elastomeric layer has a modulus of elasticity in the range 50–100 N/mm$^2$, as determined for temperatures in the range from ambient to 200° C.

11. The disk brake pad of claim 7 wherein said friction lining has a modulus of elasticity in the range of 1000–2000 N/mm$^2$.

12. The disk brake pad of claim 7 wherein said first layer of elastomeric material has a modulus of elasticity in the range of 50–100 N/mm$^2$.

13. The disk brake pad of claim 7 wherein said second layer of elastomeric material has a modulus of elasticity in the range of 300–800 N/mm$^2$.

14. A disk brake pad comprising:

a metal backplate and a friction lining separated by first and second elastomeric layers; said metal backplate engaged with said first elastomeric layer and said friction lining engaged with said second elastomeric layer; said first and second elastomeric layers directly engaged with each other, and wherein said second elastomeric layer is softer than said friction lining and has a thermal conductivity lower than said friction lining.

15. The disk brake pad of claim 14 wherein said friction lining and said first and second layers of elastomeric material are formulated to exhibit approximately the same amount of thermal expansion when heated from ambient temperature to 200° C.

16. The disk brake pad of claim 14 wherein said friction lining and said second elastomeric layer are formed with a plurality of grooves therein.

17. A brake element according to claim 14 wherein said friction lining has a modulus of elasticity in the range 1000–2000 N/mm$^2$, said second elastomeric material layer has a modulus of elasticity in the range 300–800 N/mm$^2$ and said first elastomeric layer has a modulus of elasticity in the range 50–100 N/mm$^2$, as determined for temperatures in the range from ambient to 200° C.

18. A brake element according to claim 14 wherein the thermal conductivity of said second layer of elastomeric material is in the range of from 8–12% of that of said friction lining, but greater than that of said first layer of elastomeric material.

19. The disk brake pad of claim 14 wherein said friction lining has a modulus of elasticity in the range of 1000–2000 N/mm$^2$.

20. The disk brake pad of claim 14 wherein said first layer of elastomeric material has a modulus of elasticity in the range of 50–100 N/mm$^2$.

21. The disk brake pad of claim 17 wherein said second layer of elastomeric material has a modulus of elasticity in the range of 300–800 N/mm$^2$.

* * * * *